Feb. 20, 1940.   C. O. BROWNE ET AL   2,190,753
APPARATUS FOR AMPLIFYING ELECTRICAL VARIATIONS
Filed Sept. 14, 1935   4 Sheets-Sheet 1

Inventors:
C. O. Browne,
F. Blythen
By: J. Oppenheimer, Atty.

Feb. 20, 1940.  C. O. BROWNE ET AL  2,190,753
APPARATUS FOR AMPLIFYING ELECTRICAL VARIATIONS
Filed Sept. 14, 1935  4 Sheets-Sheet 2

Inventors:
C. O. BROWNE,
F. BLYTHEN

Feb. 20, 1940.   C. O. BROWNE ET AL   2,190,753
APPARATUS FOR AMPLIFYING ELECTRICAL VARIATIONS
Filed Sept. 14, 1935   4 Sheets-Sheet 4

Inventors:
C. O. BROWNE,
F. BLYTHEN

Patented Feb. 20, 1940

2,190,753

UNITED STATES PATENT OFFICE 2,190,753

APPARATUS FOR AMPLIFYING ELECTRICAL VARIATIONS

Cecil Oswald Browne, London, and Frank Blythen, Hayes, England, assignors to Electric & Musical Industries Limited, Middlesex, England, a company of Great Britain Application September 14, 1935, Serial No. 40,532
In Great Britain September 18, 1934

9 Claims. (Cl. 179—171)

The present invention relates to apparatus for amplifying electrical variations.

It is known that for certain purposes, such for example as television, code telegraphy and the like, it is required to amplify electrical variations having components of frequencies extending downwards to effectively zero frequency, or direct current. In the case of television, for example, the low frequency and direct current components represent the average brightness, and changes in the average brightness, of the object of which an image is to be transmitted; for convenience in the present specification, any or all of these components of very low frequency down to zero frequency will be referred to as the D. C. component of the variations to be amplified. It will be understood that the D. C. component need not necessarily include a direct current component.

A thermionic amplifier capable of amplifying the whole range of frequencies which electrical variations of the kind referred to may include requires to have conductive couplings between stages and, at least where a high degree of amplification is required, presents considerable practical difficulties.

In the transmission of electrical signals containing a D. C. component through channels such as amplifiers incapable in themselves of transmitting the D. C. component the signals adjust themselves in such a manner that the areas enclosed by the signal wave form above and below the so-called electrical zero line are equal. Thus, as the D. C. component of the signal varies the absolute values of the signal assume different positions with reference to the electrical zero. This effect is sometimes termed the wander of the electrical zero of the signal since the effect may be regarded as a wander of the zero with reference to the signal wave form, and is also referred to as the absence of the D. C. component or in the case of television signals as the absence of the "background brightness" component.

It is an object of the present invention to provide novel means whereby amplification of electrical variations having components down to effectively zero frequency can be effected with the aid of an A. C. amplifier, that is to say, an amplifier incapable in itself of amplifying D. C.

In some cases the D. C. component of a signal may be lost in the apparatus in which the signal is generated. An example of this is provided by certain forms of iconoscope used for the generation of picture signals in a television transmitter. The picture signals are capacity fed from the insulated elements of a mosaic screen to a signal plate in the circuit of which a load resistance is inserted. The picture signal currents set up differences of potential across the load resistance and, in general, these differences of potential do not contain the D. C. component of the signal.

It is a further object of the present invention to provide novel means for obtaining a signal which contains a D. C. component from a signal, generated for example in the manner set forth above, which does not contain a D. C. component.

The present invention accordingly provides a method of producing from an input signal from which the D. C. component is absent an electrical output signal, such for example as a television signal, of a desired wave form, said desired wave form being a wave form in which a D. C. component or the absolute value of the signal is represented and in which, during certain recurrent periods, the signal assumes a datum value, which method comprises the use of a switching device adapted to convert the wave form of the input signal to the desired wave form by fixing the value of the signal during said periods, said switching device being rendered operative only during predetermined spaced intervals of time.

The periods above referred to in the above paragraph may be regularly recurrent but are not necessarily so.

For the purpose of the present specification a switching device is taken to mean a device which is capable of assuming either a conducting or an insulating state. Thus the simplest form of switching device is a mechanically operated electric switch, but other forms of switching device, such for example as electron discharge devices, may also be employed as will hereinafter be explained. Furthermore, the switching device may be of the kind which when in the conducting state, only conducts in one direction, in which case the device will be termed a unidirectional switching device. Similarly, a bidirectional switching device is one which, when actuated, conducts in both directions. Such a device may, however, have three states other than the bidirectionally conducting state, these being the states in which it conducts in one direction only, the state in which it conducts in the other direction only and the fully insulating state.

The impedance of a switching device when in the conducting state need not necessarily be zero as long as it is low enough to perform the operation required of it.

According to another feature of the present invention there is provided a method of transmitting an electrical signal having a wave form which at spaced intervals of time assumes a value corresponding to a datum value in the intelligence represented by said signal, in which said signal is caused, by means of a switching device, to assume an absolute value during said intervals, said switching device being rendered operative intermittently during the transmission.

According to yet another feature of the present invention there is provided a method of transmitting electrically through a channel which is incapable in itself of transmitting a D. C. component, signal variations which include a D. C. component, or which, to represent correctly the intelligence to which they correspond, should include such a component, which method comprises causing the potential or current at the input of said channel to assume at intervals, a predetermined datum value, and by the aid of means including a switching device, causing the potential or current at the output of said channel also to assume at similar intervals a substantially fixed datum value, it being arranged that said datum potentials or currents exist at the input and output of said channel at the same time.

According to a further feature of the present invention there is provided a method of transmitting an electrical signal having a D. C. component through a channel which is incapable in itself of transmitting said component, which method comprises causing the signal fed to the input of said channel to assume at intervals a fixed datum value and, during the occurrence of these datum values in output signals from said channel, causing said output signals also to assume a fixed datum value by means of a switching device rendered intermittently operative by an auxiliary signal.

According to yet a further feature of the present invention there is provided a method for preventing the wander of the electrical zero of an electrical signal when transmitted through a channel which is incapable in itself of transmitting a D. C. component, which method comprises causing the signal fed to the input of said channel to assume at intervals a fixed datum value, and, during the occurrence of these datum values in output signals from said channel, causing said output signals also to assume a fixed datum value by means of a switching device rendered intermittenly operative by an auxiliary signal.

According to a still further feature of the present invention there is provided a method for preventing wander of the electrical zero of, or for giving an absolute value to, an electrical signal having a recurrent datum value, which method comprises bringing said signal to a fixed datum potential during the occurrence of said datum value by means of a switching device rendered intermittently operative by an auxiliary signal.

The invention also provides a method for preventing wander of the electrical zero of, or for giving an absolute value to, an electrical signal having a recurrent datum value which method comprises locking the potential of the signal to a fixed datum value, by means of a bidirectional switching device, said device only being operative during periods when said signal is at its datum value.

The auxiliary signals mentioned above may be derived from the transmitted signal or they may be transmitted separately therefrom.

The invention further provides apparatus for achieving the objects of the invention, and for carrying into effect the methods set out above.

The invention will be described with reference to the accompanying diagrammatic drawings, in which Fig. 1 shows a simple circuit according to the invention.

Figure 1:
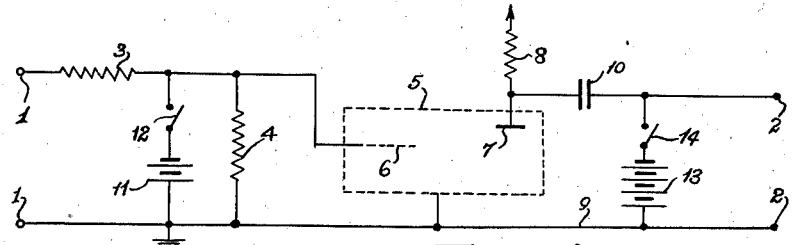

Referring to Fig. 1, signal variations containing a D. C. component are applied to a pair of input terminals 1, and it is desired to derive amplified signals, corresponding to the input signals, from output terminals 2. The signal voltage is applied through a resistance 3 across the terminals of a resistance 4. The potential differences set up across resistance 4 are applied to the input of an A. C. amplifier represented diagrammatically by the rectangle 5, the grid of the input valve being shown at 6 and the anode of the output valve at 7. The anode 7 is connected to a suitable source of potential (not shown) through a resistance 8, the negative terminal of the source being connected to the conductor 9 and earth. The potentials developed across resistance 8 are fed to the output terminals 2 through a condenser 10. With the arrangement so far described, the D. C. signal components will not reach the terminals 2.

In parallel with resistance 4 is arranged a battery 11 in series with a switch 12, and in parallel with the output terminals 2 is arranged another battery 13 in series with a second switch 14. Means, not shown, are provided for closing the two switches 12 and 14 substantially simultaneously for predetermined short periods and at predetermined intervals. It will be assumed that battery 11 has a voltage $V_1$ and that battery 13 has a voltage $V_2$, where $V_2$ is the voltage which would appear in the output in response to a voltage $V_1$ in the input if the D. C. component were transmitted through the amplifier 5 with the same amplification as the higher frequency components. It will further be assumed that at a given time under consideration the direct current component of the signal has a value such as to make the voltage on the grid 6 $V_3$ relative to earth. The corresponding output voltage should in this case be $$V_3 \cdot \frac{V_2}{V_1}$$

When the switches 12 and 14 are closed, the voltage of grid 6 changes from $V_3$ to $V_1$, a change of $V_1-V_3$ volts, and there is produced in the output, due to this change, a pulse of amplitude $$(V_1-V_2)\frac{V_2}{V_1}$$

volts. The pulse of current through the output valve of the amplifier 5 due to the change in input potential changes the potential of the left hand plate of the condenser 10 by $$(V_1 - V_2) \frac{V_2}{V_1}$$

volts. At this time, however, the switch 14 is closed and the voltage between terminals 2 is determined by the battery 13 and is equal to $V_2$. The potential of the right hand plate of condenser 10 is then $V_2$ volts relative to earth. When switches 12 and 14 are opened, the charge on condenser 10 provides at terminals 2 a D. C. potential difference equal to $$V_2 - (V_1 - V_3)\frac{V_2}{V_1} = V_3 \cdot \frac{V_2}{V_1}$$

which is the desired output D. C. component corresponding to the input component $V_3$. The time constant of the condenser 10 and the circuit associated with the output terminals 2 is of course arranged to be high enough to ensure that little change takes place in the charge on the condenser 10 in the intervals between successive closures of the switches 12 and 14. The terminals 2 may conveniently be connected to the control grid and cathode of a further thermionic valve, or the like, in which case the terminals 2 may be regarded as substantially open circuited.

It should be noted that although the pulse caused in the input circuit by the opening of the switch 12 produces a corresponding pulse in the output circuit, it does not change the charge on the condenser 10 because at this time the switch 14 is open and the right hand plate of the condenser is insulated. This pulse occurs during an interval (which may be called the stabilizing interval) when it is assumed that distortion of the signals is immaterial.

Unless the two switches can be arranged to open and close simultaneously, it should be arranged that the switch 12 closes just before and opens just after the switch 14. The lengths of the periods of closure of the switches must be made longer than the reciprocal of the highest frequency transmitted by the amplifier 5 in order to allow the output signal to attain the correct value during each period of closure.

The battery 13 of Fig. 1 is shown for convenience in description only and may be omitted, as will be appreciated from what follows; the battery may provide a potential $V_2$ as in the particular example given, or it may provide any other suitable potential. If battery 13 is omitted, then the lower terminal of switch 14 must be connected to earth. Whatever potential battery 13 may have (the potential may be negative, zero or positive), D. C. will be established at terminals 2, that is to say, zero wander will be eliminated. If the battery has a potential $V_2$ then the output signals are correctly referenced with respect to earth as datum potential. It will often happen that this is not the desired condition. For example, if the signals are in the positive direction at the upper terminal 2 and if this terminal is to be connected to the grid of a valve having its cathode earthed, then unless the upper terminal 2 is maintained more negative with respect to earth than the amplitude of the peak signal, grid current will flow in the valve and distortion may result. The signals are therefore required to be referenced about a potential negative with respect to earth by such an amount that the upper terminal 2 never becomes positive. The correct reference potential is obtained by providing a battery 13 suitably connected to provide the desired negative potential.

The input circuit of Fig. 1 which comprises resistances 3 and 4, battery 11 and switch 12 is also shown for the purpose of explanation only. In many cases the function of the switch 12 will be inherent in the source which supplies signals to terminals 1. For example, the scanning of a picture having black portions gives intermittent signals of amplitude corresponding to black and these black signals may be used as periods of datum value of input. In some scanning systems the signals in the intervals between successive lines and frames may be representative of an absolute value of picture brightness and these intervals therefore provide periods of datum input potential. As long as the output switching device is caused to become conductive at suitable instants, the method described with reference to Fig. 1 may be used to establish or to re-establish D. C.

The arrangement described is suitable for television, code telegraphy and other purposes where there occur, or where there can be arranged to occur, periods during which no signals are transmitted. As has been stated, in the case of television, the intervals between the scanning of successive lines and frames may constitute such periods.

In the arrangement above described, the voltages at the input and the output are periodically fixed at correct relative values. Clearly the currents may be fixed instead of the voltages and this will in general require an inductance to be used in place of the condenser 10, a current of proper value being established in the inductance instead of a proper voltage being established across the condenser.

Instead of either or both of the mechanical switches 12 and 14 if two switches are employed, there may be provided the anode-cathode paths of thermionic valves, these paths being rendered conducting at suitable instants by suitable means, such for example, as positive pulses applied to their grids from a suitable source.

Figure 2:
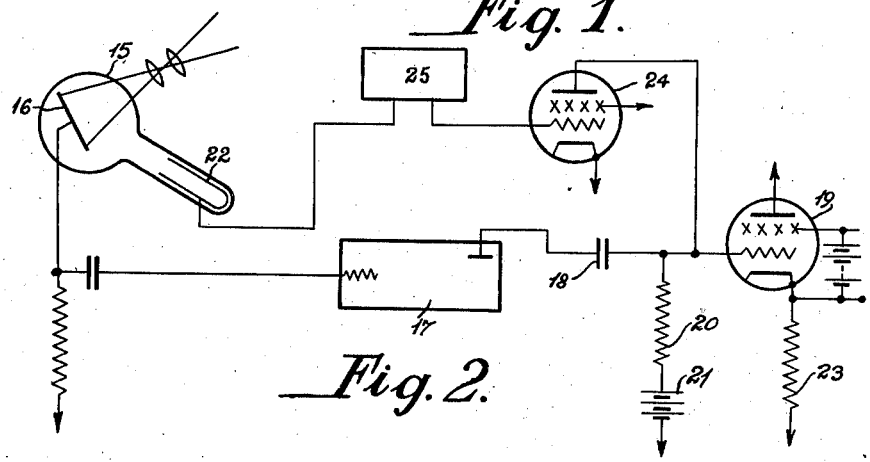
Fig. 2 shows the application of the invention to a television transmitter.

Referring now to Fig. 2, a cathode ray transmitter 15, which may be of the kind described by Zworykin, in the Journal of the Institution of Electrical Engineers, October 1933, page 437, as an Iconoscope, has its signal plate 16 coupled to the input of an A. C. amplifier 17, the output of the amplifier being coupled through a condenser 18 to the control grid of a cathode-follower valve 19. A cathode follower valve is one in which the load impedance is connected in the cathode circuit. The load may be connected between the cathode and earth and the input between the control grid and earth. If then the anode is maintained at a suitable fixed potential, positive with respect to earth, the potential of the cathode will vary in the same direction as, and to an extent almost equal to, the variations of potential of the control grid. The control grid of the cathode-follower valve 19 is connected to earth through a resistance 20 in series with a battery 21. The various leads in the figure marked with an arrow head are connected to earth, either directly or through suitable sources of voltage. The cathode (not shown) of the tube 15 is earthed and the control electrode thereof is indicated by 22. The cathode of the valve 19 is connected through a resistance 23 and a suitable potential source (not shown) to earth. The grid of valve 19 is also connected to the anode of a valve 24, the control grid of this valve being connected to one output terminal of a source of impulses 25, another terminal of the source 25 being connected to the control electrode 22. The source 25 is arranged to generate pulses periodically, preferably in the intervals between the scanning of successive lines of the image, and it is arranged that positive pulses are applied to the grid of valve 24 and negative pulses to the control electrode 22.

The effect of a pulse from the source 25 is on the one hand to make the control electrode 22 negative and so cut off the cathode ray, and on the other hand to make the grid of valve 24 positive and so to make the potential on the grid of the valve 19 substantially equal to that of the cathode of the valve 24.

The effect of cutting off the cathode ray is to generate a pulse having an amplitude which is simply related to the signal levels corresponding to full black and maximum white in the picture, and thus to apply a datum potential to the input of the amplifier 17. For a given strength of cathode ray beam, the value of the datum potential may be found to differ by a fixed amount from the signal amplitude representing black, and the difference is found to vary somewhat with the average picture brightness.

The operation of the circuit of Fig. 2 will be seen to be similar to that of Fig. 1. When an impulse is generated by source 25, there is applied to the input of amplifier 17 a pulse having an amplitude dependent upon the D. C. component of the picture signals. Simultaneously, the switch constituted by the valve 24 serves to charge the condenser 18 so as to bring the grid of valve 19 to substantially the potential of the cathode of valve 24. The condenser 18 thus receives a charge as in the case of condenser 10 in Fig. 1. The potential of the cathode of valve 19 substantially follows that of the grid, and thus the output taken from across the resistance 23 contains the D. C. component.

It will be noted that in Fig. 2, the leak 20 is provided for the condenser 18, this leak being taken to a point of such potential that, at each period of switch closure, the condenser 18 always requires to receive a charge in the direction available through the switch valve 24. The time constant of the leak 20 with the condenser 10 must be made shorter than that of the couplings in the amplifier 5 which produce the low frequency cut-off, but substantially longer than the intervals between successive switchings.

It may be mentioned that it may not be possible, unless the tube is suitably constructed, to obtain this D. C. component from the tube 15 itself. The circuit of Fig. 2, therefore, may serve not only for re-inserting signal components which are lost in an amplifier but may also serve to insert components which ordinarily would be absent but which are inherent in the signal.

Figure 3:
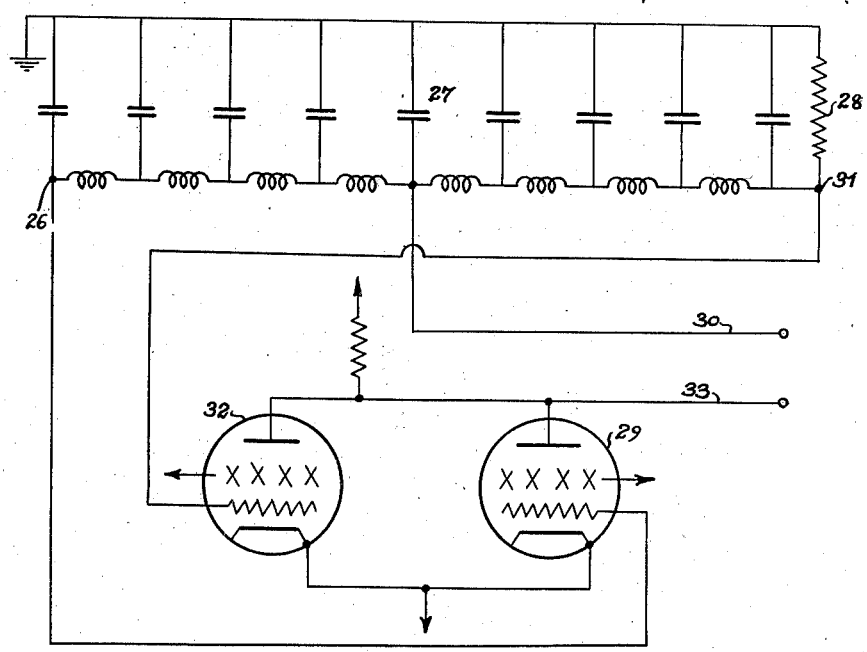
Fig. 3 shows a modification of a detail of Fig. 2.

It is desirable that the pulse applied to the control electrode 22 shall begin before and end after the pulse applied to the grid of the valve 24 so that the switch constituted by valve 24 can be regarded as operative only whilst the scanning beam is cut off. One reason for this is that it is practically impossible to arrange that the opening of switch 24 and the cutting-off of the cathode ray beam take place simultaneously and last for the same period of time; it is clearly undesirable that the switch 24 should be closed excepting when the beam is cut off. A further reason is that the cutting-off of the cathode ray beam may cause the generation of spurious signals, probably due to re-arrangement of the charge on the walls of the Iconoscope 15; these spurious signals make it necessary to switch on the valve 24 not only after the beam has been cut off, but also after any spurious signals have ceased. Were the valve 24 switched on before the cessation of the spurious signals, and were the latter of suitable wave form and sufficient amplitude, the valve 24 acting as a diode rectifier would give to the right hand side of condenser 18 a negative charge; since the current flowing from the battery 21, through resistance 20 to condenser 18 is relatively small, it is possible that this negative charge would not be neutralised before the valve 24 opened again, in which case the potential at the grid of valve 19 would not correctly represent the D. C. component. In Fig. 3 there is shown a circuit whereby it may be arranged that the opening of switch 24 takes place a suitable interval after the cutting off of the cathode ray beam. The circuit of Fig. 3 is intended to replace parts of the circuit of Fig. 2, as will hereinafter be explained.

Positive impulses from a generator such as 25 in Fig. 2, instead of being led to the valve 24, are applied between the point 26 on a delay network 27 and earth; the network comprises shunt condensers and series inductances, and is terminated by a resistance 28. The impulses fed to the point 26 are also applied directly to the control grid of a valve 29. A tapping 30 from halfway along the network 27 is connected to the control grid of the valve 24 in Fig. 2. The end 31 of the network is connected to the control grid of a valve 32, and the anodes of the valves 29 and 32 are connected together and by a lead 33 to the control electrode 22 of Fig. 2.

It is arranged that the output from either of the valves 29 or 32, taken separately, is sufficient to provide the necessary bias to the control electrode 22 to suppress the cathode ray beam.

In operation, the leading edge of a positive pulse applied to point 26 first reaches the grid of the valve 29 thereby giving to lead 33 the negative pulse necessary to cut off the cathode ray beam. The leading edge later arrives at the mid point of the network 27 and a positive pulse passes along lead 30 and operates the switch valve 24. The leading edge next reaches the point 31 and the grid of valve 32 and therefore this valve becomes conducting. Valve 29 is already in the conducting state due to the direct pulse from point 26, and when valve 32 becomes conducting an additional negative pulse is sent along lead 33. The cathode ray beam is already cut off and this pulse therefore has no effect. The trailing edge of the pulse applied to point 26 then arrives at the grid of valve 29 and restores the potential of this grid to its original value. Since, however, the positive pulse from point 31 still remains on the grid of valve 32, this change in valve 29 has no effect on the cathode ray beam, valve 32 being capable of maintaining the beam in the cut off condition. The trailing edge next reaches the mid point of network 27 and the grid of valve 24 is restored to its former potential, thus opening the switch constituted by this valve. Finally the trailing edge reaches point 31 and the grid of valve 32. This grid is returned to its original potential, the potential of lead 33 rises and the cathode ray beam is restored. Thus during the interval between the times at which the leading and trailing edges of the positive pulse reach the mid point of network 27, the condenser 18 charges up to such an extent that the output of valve 19 contains the D. C. component.

An alternative way in which the arrangement of Fig. 2 may be worked is as follows. It is arranged that valve 24 is switched on during the scanning of the lines of the picture and D. C. is established with reference to the black parts of the picture. It is found that, in general, there is sufficient black in ordinary scenes for this purpose. In this alternative the picture signals must arrive from amplifier 17 with black positive and white negative. During the intervals between lines it sometimes occurs that, even with the beam switched off, large spurious signals are produced. Valve 24 is maintained inoperative (i. e. insulating) during these spurious signals but is switched on shortly after the beginning and off shortly before the end of each line. Any dark or black signals then cause valve 24 to keep condenser 18 charged so that these black signals produce on the grid of valve 19 a potential substantially equal to the potential of the cathode of valve 24. Any true vision signals other than black have no effect on valve 24 since they drive the anode of this valve negative with respect to its cathode so that valve 24 is effectively insulating as far as the vision signals are concerned. The spurious signals in the intervals between the lines can have no effect on valve 24 whatever their amplitude may be, since during these spurious signals, valve 24 is insulating.

It will be noted that in the simple arrangement shown diagrammatically in Fig. 1, current can flow in both directions through the switch 14 when it is in its closed position, and that when the switch 14 is open, the right hand side of condenser 18 can be completely insulated. On the other hand, in Fig. 2, current can flow in one direction only through switch valve 24, and it is accordingly necessary to provide a leak for the condenser 18 so that the condenser 18 can receive a charge each time switch 24 closes. There is thus a leakage of the D. C. component during the intervals between closures of switch 24.

Figure 4:
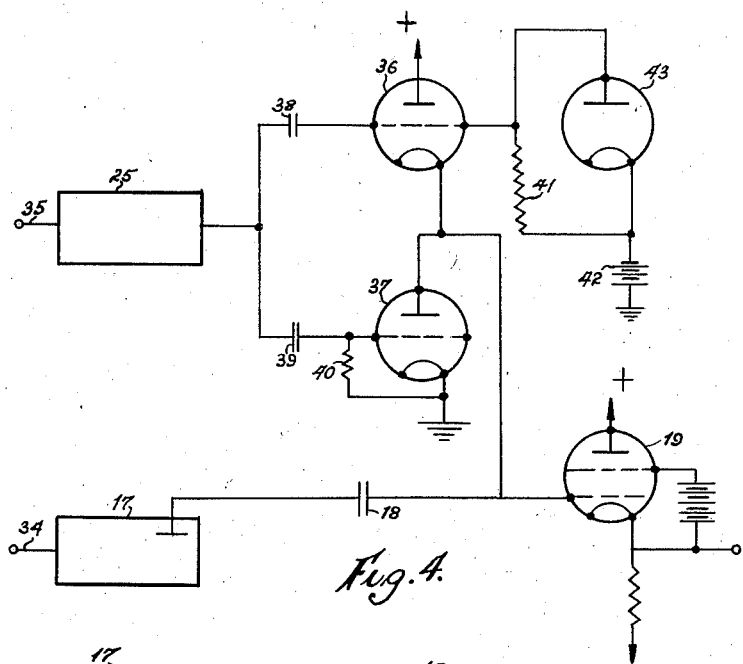
Fig. 4 illustrates a modification of the arrangement shown in Fig. 2.

A modification of the arrangement of Fig. 2, which employs two-way conducting switches, as in Fig. 1, is shown in Fig. 4. Referring to Fig. 4 an A. C. amplifier 17 feeds a cathode-follower valve 19 through a condenser 18, and it is desired to re-insert the D. C. component on the grid of the valve 19. The lead 34 from amplifier 17 passes to a source of signals such as an Iconoscope, and in this case the lead 35 from a source 25 of switching impulses passes to the control electrode of the Iconoscope.

In place of the valve 24 and leak 20 of Fig. 2 two valves 36 and 37 are employed; the anode of valve 36 is connected to the positive terminal of a source (not shown) of anode current, and its cathode is connected to the anode of valve 37 and to the control grid of valve 19. The cathode of valve 37 is connected to the negative terminal of the anode current source, which is earthed.

Pulses from the source 25 are fed to the grids of valves 36 and 37, in the positive sense, through condensers 38 and 39 respectively; valve 37 is provided with a grid leak 40. The grid of valve 36 is earthed through resistance 41 and bias battery 42 in series, and resistance 41 is shunted by diode 43, the function of which will be explained hereinafter.

The pulses fed to the grid of valve 37 from source 25 cause grid current to flow, and thus to charge the condenser 39; the grid of valve 37 thus eventually acquires such a negative potential that no anode current flows unless a pulse is present on the grid.

The valve 37, when it is conducting, serves as a cathode circuit impedance for the valve 36, which accordingly functions as a cathode follower. The potential to which condenser 18 is stabilized accordingly depends on the datum potential which the grid of valve 36 is caused periodically to assume, since the cathode of this valve tends to set itself slightly negative relative to the potential of its grid. The datum potential may be determined by the source 25, each pulse driving the grid of valve 36 to the same potential, or by means of the diode 43, which operates in the following manner: each pulse from source 25 causes current to flow in diode 43, thus charging condenser 38 to a negative potential which eventually reaches a value such that no anode current flows in valve 36 unless a pulse is present on its grid; each pulse thus causes the grid of valve 36 to assume the potential of bias battery 42, and by adjusting this potential, control of the potential to which condenser 18 is stabilized can be obtained.

If when a pulse causes valves 36 and 37 to pass current, the charge on condenser 18 is not of the right value, the potential of the cathode of valve 36, and hence of the anode of valve 37, will increase or decrease slightly and the current in valve 37 will increase or decrease so as to give the charge the correct value. It can be arranged that a small change in the potential of the cathode of valve 36 causes a large change in the current flowing in valve 37, so that the potential of condenser 18 is very rapidly stabilized.

The valves 36 and 37 are arranged to be conducting during what have been referred to as stabilizing intervals; the latter, in the case of television signals for example, may be the intervals between trains of picture signals, and it must be arranged that no anode current passes in valves 36 and 37 other than in the stabilizing intervals. It is also important that the flow of anode current in valves 36 and 37 should cease abruptly, since if these valves are shut off slowly, the charge on condenser 18 may change.

It may be arranged that the valve 37 is shut off slightly before valve 36 if desired, since the cutting-off of valve 37 only causes a slight change in the potential of the cathode of valve 36. Alternatively, it may be arranged that the amplitudes of the pulses which are applied to the grids of valves 36 and 37 are so related to one another that the potential of the cathode of valve 36 does not vary substantially during the shutting-off of valves 36 and 37.

The valves 36 and 37 may have similar characteristics and may be supplied with similar operating potentials, in which case it may be arranged that the grid of valve 37 is always biased slightly negative; this may be achieved by connecting the anode of a diode to the grid of valve 37 and biasing the cathode of the diode slightly negative relative to the cathode of valve 37; in this case, it may be arranged that both valves 36 and 37 are shut off at substantially the same rate, in which case the cathode of valve 36 will remain at a substantially constant potential during the shutting-off of the valves.

Figure 5:
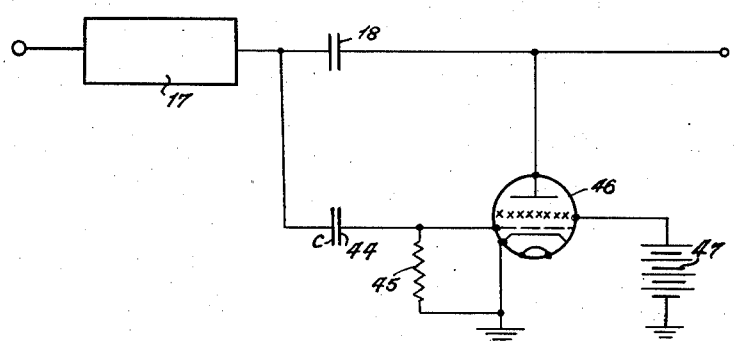
Fig. 5 shows a further embodiment of the invention.

Fig. 5, to which reference is now directed, shows a circuit which is particularly suitable for use in television systems, for re-establishing the D. C. component with reference to the peak amplitudes of the synchronising pulses. In Fig. 5, it is assumed that the synchronising pulses are in the positive sense. Were the synchronising pulses in the negative sense, it would be necessary to insert a reversing valve in the connection between the A. C. amplifier 17 and the control grid of the stabilising valve 46; the arrangement, however, is shown for synchronising pulses positive. The valve 46 is a tetrode of the type in which there is sufficient secondary emission from the anode to ensure that the anode current is negative for values of anode potential slightly less than the screen potential, that is to say, the anode current-anode voltage characteristic crosses the base line. The screening grid is given a positive potential relative to the cathode by means of battery 47. The amplifier 17, is an A. C. amplifier to the input of which are applied signals comprising trains of picture signals having synchronising pulses in intervals between them, the synchronising pulses being assumed to be in the blacker-than-black sense; the synchronising pulses from amplifier 17 serve to switch on the valve 46 through the connection to its control grid. For normal signal amplitudes, the control grid is very negative and the valve 46 is inoperative. When a synchronising pulse occurs, the control grid of valve 46 is driven to approximately zero potential, the condenser 44 and leak 45 serving to bias the control grid automatically. The valve 46 becomes conductive and stabilises the potential of its anode to a valve adjacent to the potential of the screen and representing the point on the anode current characteristic where the anode current is zero. The mechanism of the D. C. re-establishment can best be followed by reference to the two Figures 6 and 7.

Figure 6:
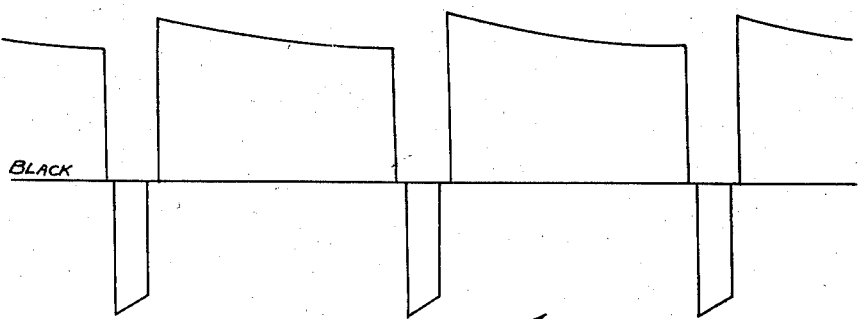
Figs. 6 and 7 are explanatory drawings.
Figure 7:
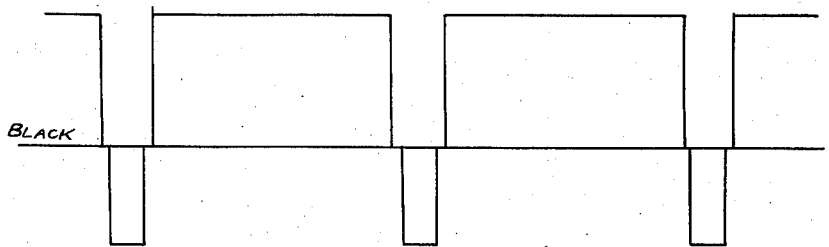

Had there been employed for re-inserting the D. C. component a conventional diode together with a suitable leak a certain amount of charge on the condenser 18 would have leaked away during each line between the synchronising pulses. For a full white picture, the resultant wave form would have appeared as in Fig. 6; in this figure and in Fig. 7 signal voltage or current is plotted against time as abscissa. Referring to Fig. 6 in which parts of the signal above the line marked "black" represent picture signals, the slope of the line representing white during each line is due to the leaking away of the charge. This slope can be made as small as desired by suitably increasing the leak, but if sudden changes of brightness are to be followed correctly this increase involves the construction of the amplifier 17 so that it can pass lower frequencies than would otherwise have been necessary. Furthermore, it is seldom possible to make a diode which has such low resistance that the charging of condenser 18 is completed during a short synchronising pulse. With this incomplete charging, when using frame pulses of longer duration than the line pulses, an irregular effect is produced during the frame pulses which give the diode a better change to charge the condenser fully, thus producing a slightly irregular D. C. re-establishment.

Wth the arrangement shown in Fig. 5, there is no leak, so that for a full white picture, the curve obtained (Fig. 7) is quite flat during the intervals between synchronising pulses; in fact, if the natural leakage across condenser 18 is zero, then the valve 46 will only have to pass anode current when there is a change in average brightness, that is, a change in the D. C. component.

Figure 8:
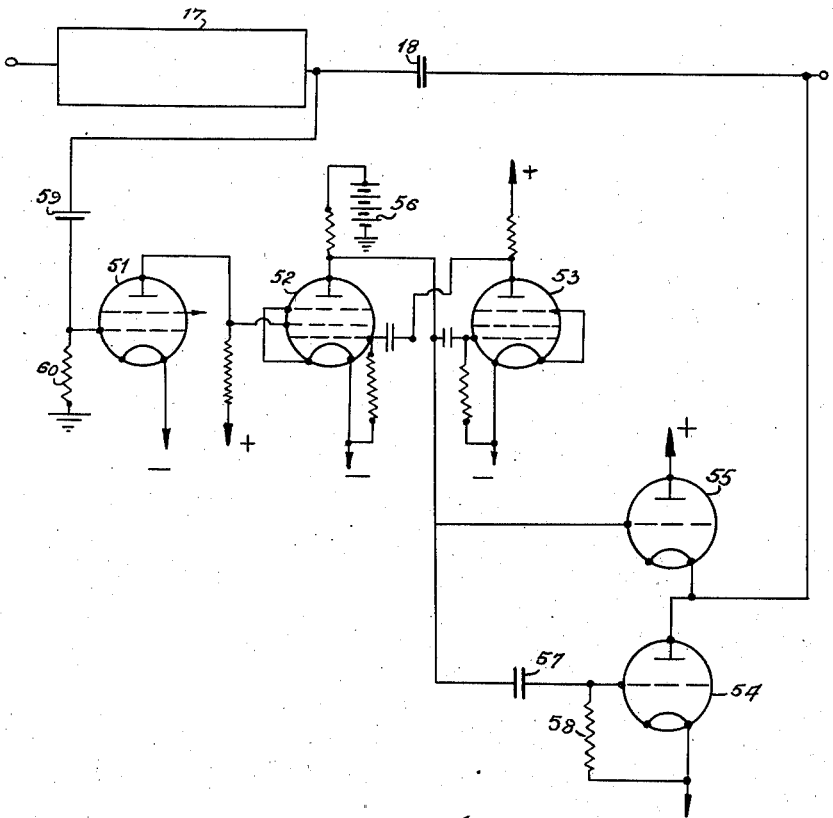
Fig. 8 illustrates a modification of the arrangement of Fig. 4.

Reference will now be made to Fig. 8, which shows an arrangement which is a modification of that shown in Fig. 4, and which has in common with the arrangement of Fig. 5 the feature that the re-establishment of D. C. is carried out with reference to the peaks of the synchronising pulses; in the arrangement of Fig. 8, the control pulses are generated by a multi-vibrator actuated by the synchronising pulses. The synchronising pulses are assumed to be in the positive sense; the valve 51 serves to apply a negative pulse to the screen grid of valve 52 at the beginning of a synchronising pulse which triggers the multi-vibrator 52, 53, and causes the anode of valve 52 to become more positive. The values of the condensers and resistances in the grid circuits of the valves 52 and 53 are so adjusted that the multi-vibrator oscillates at line frequency, giving a positive pulse on valve 52 which is slightly shorter than the line synchronising pulse, that is to say, the condenser and leak in the grid circuit of valve 52 has a shorter time constant than the condenser and leak in the grid circuit of valve 53; a multi-vibrator of this form is described in co-pending application No. 7,730/35. Positive pulses are fed from the anode of valve 52 to the stabilizing valves 54 and 55; these latter valves operate in a similar manner to valves 36 and 37 in Fig. 4.

It will be seen that there is a direct conductive connection between the anode of valve 52 and the grid of valve 55, and that the anode of valve 52 is supplied by a suitable battery 56, the negative terminal of which is connected to earth. The potential of this battery decides the potential to which the output will be stabilised, because when the anode of valve 51 is positive, the valve 52 is cut off and its anode assumes the potential of the battery 56, and so does the grid of valve 55, which is conductively connected to the anode of valve 52. The control grid of valve 54 is biased automatically to beyond cut-off by means of a condenser 57 and leak 58, the grid biasing itself to approximately zero potential relative to its cathode dring the positive pulse from multi-vibrator 52, 53. The cathodes of valves 51, 52 and 53 are held negative with respect to earth by means of suitable biasing means (not shown), since their anode potentials are approximately earthy. With synchronising pulses in the positive sense, the amplitude of voltage swing of the anode of valve 52 in response to a synchronising pulse must exceed the peak amplitude of these impulses, so that valves 54 and 55 are cut off for all other signal amplitudes. The synchronising pulses are fed to valve 51 through a condenser 59, and a leak 60 is provided. Signals fed to the grid of valve 51 cause grid current to flow and thus condenser 59 becomes charged, the grid of valve 51 thus requires such a negative potential that no anode current flows unless a synchronising signal is present on the grid. In this way the synchronising signals are separated from the picture signals. If the synchronising signals from the amplifier 17 are in the negative sense, a reversing valve should be inserted between amplifier 17 and valve 51.

By setting the multi-vibrator to deliver positive pulses to valve 55 which are slightly shorter than the synchronising pulses, which latter serve to provide a datum potential at the input of amplifier 17, it is arranged that the valves 54 and 55 are well shut off before the end of the synchronising pulses. Furthermore, by setting the condensers and leaks in the grid circuits of valves 52 and 53 so that the multi-vibrator oscillates naturally at line frequency, it can be arranged that the multi-vibrator oscillates steadily at line frequency during the transmission of frame pulses in the form of broadened line pulses, so that the D. C. re-establishment by valves 54 and 55 is quite regular during the frame interval. The value of condenser 18 can be made as large as desired provided that valves 54 and 55 are capable of charging it sufficiently during one synchronising pulse to allow for any required correction. The natural resistance looking into the cathode circuit of valve 55 may be, say, 150 ohms or less, which allows a very effective charging of condenser 18.

In an arrangement in which D. C. is restored with reference to peak amplitudes, a two-way switching device being employed, it may be arranged that the device remains permanently conductive in one direction and becomes alternately conductive and non-conductive in the opposite direction. The device may of course comprise two paths in parallel, the first being permanently conductive in one direction and insulating in the other direction and the second being permanently insulating in one direction (the direction in which the first is conductive) and being associated with means for causing it to become alternately conductive and insulating in the opposite direction.

Figure 10:
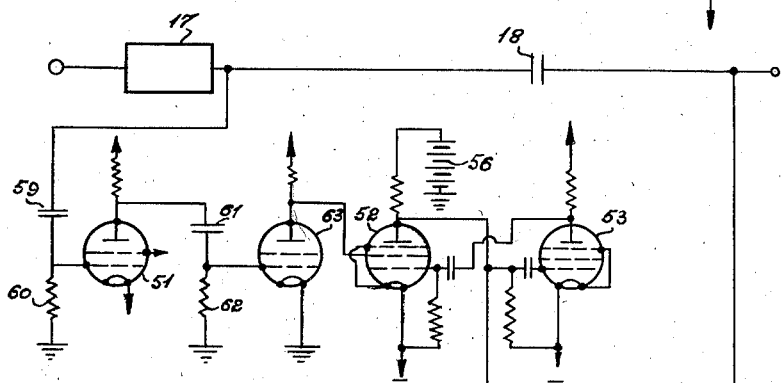
Fig. 10 shows a modification of a detail of Fig. 8.
Figure 9:
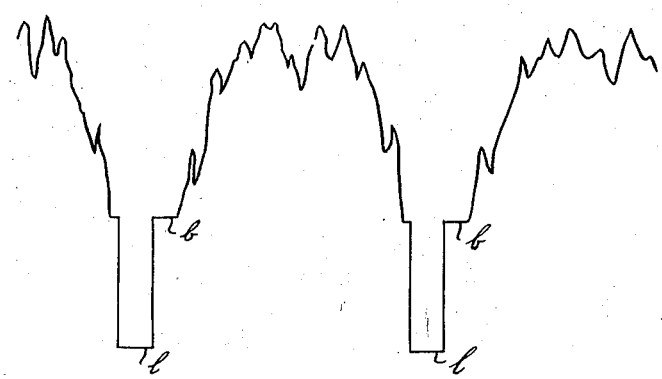
Fig. 9 is a further explanatory drawing.

A further example of the use of the present invention is illustrated in Figs. 9 and 10, Fig. 9 being an explanatory figure in which signal voltage or current is plotted against time as abscissa. Fig. 9 shows a wave form where after each line synchronising pulse $l$ there is a short interval $b$ of black. If desired, the D. C. component may be re-established with reference to this black interval. This may be achieved by means of a circuit such as is shown in Fig. 10 which is a modification of the arrangement of Fig. 8, it being arranged however, that the multi-vibrator 52, 53 makes valves 54 and 55 active during the short black interval $b$. In Fig. 10 the valve 51 operates in a manner similar to the operation of valve 51 of Fig. 8 and serves to separate the synchronising pulses as before, that is to say, its grid assumes approximately zero potential during the synchronising pulse, but the valve is cut off for all other amplitudes. In its anode circuit, however, is a small condenser 61 feeding a resistance 62. The condenser 61 serves to produce differentiated synchronising pulses across the resistance 62. At the beginning of the synchronising pulse, a sharp negative pulse appears at the top of resistance 62, whereas at the end of the synchronising pulse a positive pulse appears at this point. This positive pulse operates on the grid of valve 63 causing its anode to become negative and pull the screen grid of valve 52 negative, thus triggering the multi-vibrator. The multi-vibrator is now set to produce a positive pulse on the anode of valve 52 during the black interval $b$ in Fig. 9. The remainder of the circuit is as shown in Fig. 8.

In the arrangements described with reference to Figs. 5 and 8, it will be seen that the synchronising impulses serve to apply a datum potential to the input of the A. C. amplifier. It is assumed that the synchronising signals have been added to the picture signals at instants when the picture signals were at datum value, or at some value fixedly related to datum value, or have been caused artificially to assume such datum values, so that the synchronising impulses all cause the input to assume substantially the same datum potential. Clearly, any other suitable means, such as those employed in the arrangements of Figs. 1 and 2, may be employed for providing the input datum potential.

Figure 11:
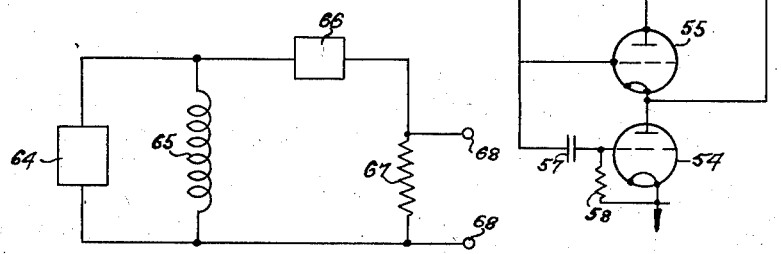
Fig. 11 shows an explanatory circuit diagram of a further embodiment of the invention.

It has been stated earlier in this specification that, instead of adjusting the charge on a condenser in order to establish D. C., the current in an inductance may be adjusted for this purpose. Fig. 11 is an explanatory diagram illustrative of the principle of current stabilisation. In Fig. 11 a high impedance source 64, such as the output of an A. C. amplifier or the like, has a high inductance 65 connected across it. A bi-directional switching device 66 and a low resistance 67, connected in series with one another, are connected in shunt with inductance 65. The output is taken off across resistance 67 through terminals 68.

In operation, the bi-directional switching device 66 is arranged to insulate during periods of datum potential, for example, by means of pulses applied to it in a manner such as has already been described. During these periods the current in the inductance 65 is forced to assume the value of the output current of the source 64 corresponding to the datum potential and, due to the high value of the inductance, remains substantially at this value during the periods when the switching device 66 is in the insulating state. When device 66 is in the bi-directionally conducting state, the current in output resistance 67 is determined by the difference between the instantaneous current from source 64 and the datum current in inductance 65.

The invention has been particularly described, by way of example, with reference to amplifiers for television signals, but it will be apparent to those versed in the art that it is not so limited, but is applicable to many other systems in which it is required to amplify signals having a D. C. component, but where the use of a direct coupled amplifier is impracticable or inconvenient and also to systems in which it is required to obtain a signal containing a D. C. component from a signal which has an absolute D. C. significance but which does not contain a D. C. component.

We claim:

1. Apparatus for producing from an input signal from which the direct current component is absent, an output signal in which the direct current component is represented, said apparatus comprising a path including a resistance and a condenser in series, means for causing signal currents to flow in said path in response to said input signals, a unidirectional switching device comprising a thermionic vacuum tube in parallel with said resistance, operating means for actuating said switching device intermittently at predetermined datum levels, means for biasing the input of said tube, means for biasing the output of said tube, and means for substantially simultaneously impressing said biasing values onto said tube.

2. Apparatus for producing from an input signal from which the direct current component is absent, an output signal in which the direct current component is represented, said apparatus comprising a condenser, a bi-directional switching device so connected and arranged as to be capable, when conducting, of influencing the charge on said condenser, a source of intermittent auxiliary signals, and means for feeding said auxiliary signals to said switching device for rendering said switching device bi-directionally conductive intermittently.

3. Apparatus according to claim 2, comprising a switching device constituted by two conductive paths in parallel, one of said paths being conductive in one direction and the other being conductive in the other direction, and means for causing said auxiliary signals to render one of said paths alternately conductive and insulating.

4. The method of producing a wave form having an absolute value of direct current component from a wave form containing none or a less than absolute value of direct current component which comprises the steps of storing electrical energy to a voltage corresponding to the value of the absolute value of the desired direct current component, raising the value of the original wave to a predetermined datum wave, amplifying the original wave form at the predeterminable datum level and combining the amplified wave with the stored energy to produce the desired wave form having an absolute value of direct current component.

5. The method of producing a wave form having an absolute value of direct current component from a wave form containing none or a less than absolute value of direct current component which comprises the steps of storing electrical energy to a voltage corresponding to the value of the absolute value of the desired direct current component, raising the value of the original wave to a predetermined datum level, amplifying the original wave form at the predeterminable datum level and combining the amplified wave at recurrent intervals with the stored energy to produce the desired wave form having an absolute value of direct current component.

6. The method of producing a wave form having an absolute value of direct current component from a wave form containing none or a less than absolute value of direct current component which comprises the steps of storing electrical energy to a voltage corresponding to the value of the absolute value of the desired direct current component, raising the value of the original wave to a predetermined datum level, amplifying the original wave form at the predeterminable datum level and simultaneously combining the amplified wave with the stored energy to produce the desired wave form having an absolute value of direct current component.

7. The method of producing a wave form having an absolute value of direct current component from a wave form containing none or a less than absolute value of direct current component which comprises the steps of storing electrical energy to a voltage corresponding to the value of the absolute value of the desired direct current component, raising the value of the original wave to a predetermined datum level, amplifying the original wave form at the predeterminable datum level developing auxiliary control signals and combining the amplified wave with the stored energy to produce the desired wave form having an absolute value of direct current component in accordance with the control by the generated control signals.

8. Apparatus for producing from an input signal from which the direct current component is absent, an output signal in which the direct current component is represented, said apparatus comprising a path including a resistance and a condenser in series, means for causing the signal current to flow in said path in response to said input signal, a unidirectional switching device in parallel with said resistance, means for actuating said switching device during periods in which said input signal has a datum value, and means for actuating said switching device during periods in which said input signal differs from a datum value in such a sense as to be incapable of actuating said switching device.

9. Apparatus for producing from an input signal from which the direct current component is absent, an output signal in which the direct current component is represented, said apparatus comprising a condenser, a bi-directional switching device so connected and arranged as to be capable, when conducting, of influencing the charge on said condenser, a source of intermittent auxiliary signals, and means for feeding said auxiliary signals to said switching device for rendering said device bi-directionally conductive only during periods in which said input signal has a datum value.

CECIL OSWALD BROWNE.
FRANK BLYTHEN.